Nov. 14, 1933.   G. E. JOHNSON   1,934,717

STEAM JOINT

Original Filed Dec. 22, 1930

INVENTOR
George E. Johnson
BY
Chappell and Earl
ATTORNEYS

Patented Nov. 14, 1933

1,934,717

UNITED STATES PATENT OFFICE 1,934,717

STEAM JOINT

George E. Johnson, Three Rivers, Mich., assignor to George E. Johnson & Company, Three Rivers, Mich.

Application December 22, 1930, Serial No. 503,959
Renewed September 15, 1932

6 Claims. (Cl. 285—10)

This invention relates to improvements in steam joints for revolving parts and particularly to a steam joint for paper drying cylinders.

The objects of the invention are:

First, to provide a simple and efficient joint of the class described in which the parts have great freedom of movement while they are at the same time spring pressed together.

Second, to provide a steam joint structure which is readily and effectively lubricated.

Objects pertaining to details and economies of construction and operation will appear from the description to follow. A preferred embodiment of my invention is illustrated in the accompanying drawing, in which.

Figure 2:
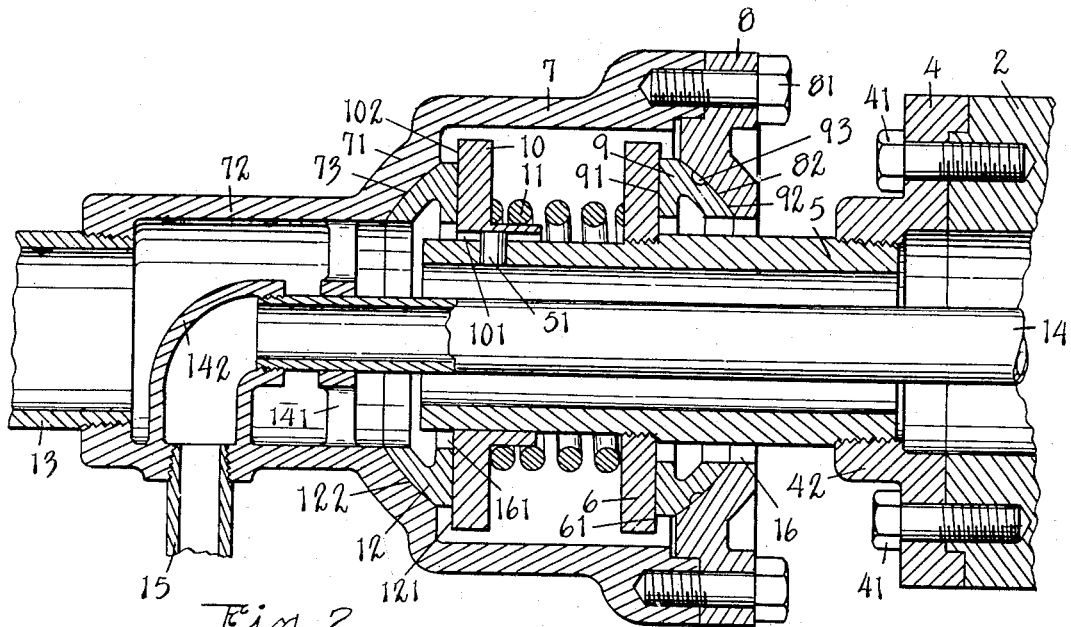
Fig. 2 is an enlarged detail vertical central section through the steam joint, the supply connection and the hub of the cylinder being shown partially in full lines with the inner portion broken away.

The parts will be identified by their numerals of reference which are the same in all the views.

1 is a steam drum of a paper drier. 2 is the elongated hollow hub bearing for the same. 3 is the bearing box which permits considerable longitudinal movement of the hub to compensate for expansion and contraction. To the end of the hub is secured the detachable collar flange 4 by cap screws 21 having the thread collar flange 42 for the steam pipe connection 5. On this connection 5 is screw threaded a flange collar 6 which has a flat bearing face 61 toward the hub and constitutes a joint member at that point.

7 is the external joint shell provided with an inwardly projecting flange 8 secured thereto by cap screws 81. A concave bearing surface 82 is provided on the flange 8 which is a segment of a sphere and between the bearing member 6 and the bearing face 82 of flange 8 is interposed a bearing ring 9. This is provided with a flat surface 91 to cooperate with the flat surface 61 on the flange 6 and on its outer face is provided with a convex bearing surface 92 constituting a portion of the surface of a sphere and within this is a lubricating groove 93, which lubricating groove may be omitted if this bearing ring 9 is made of a self-lubricating material.

A sliding ring 10 is supported on the outer end of the steam connection 5 and is secured against revolution thereon by the projecting pin 51 in key slot 101 therein. Ring 10 is provided with a plane bearing surface 102 on the outer side and between the ring 10 and the flange 6 is interposed a compression spring 11. The shell 7 is provided with an inwardly projecting portion 71 which is extended into a hub-like portion 72. On the reduced portion 71 is a concave bearing surface which is a segment of a sphere. Between the face 102 of collar 10 and the bearing surface 73 is interposed a bearing ring 12 having a flat inner surface 121 coacting with the flat surface 102 of the ring 10 and a convex bearing surface 122, which is the segment of a sphere, cooperates with the bearing surface 73.

It will thus be seen that as the cylinder revolves, the tubular steam connection 5 revolves and carries with it the screw threaded flange 6 and the sliding collar 10, the surfaces of which are flat and fit against the bearing rings 9 and 12, forcing them into their spherical seats, that towards the cylinder being a steam tight joint. The other is simply a bearing surface.

Figure 1:
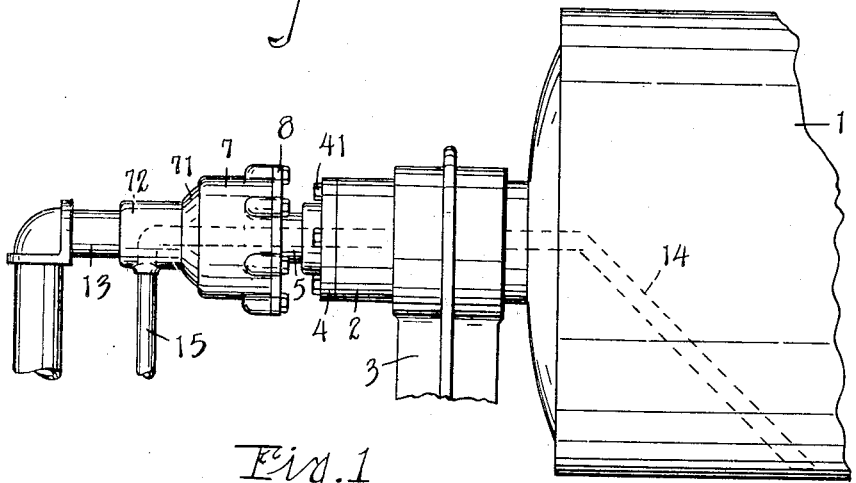
Fig. 1 is a detail elevation view of a portion of a paper drying drum with my improved steam joint connection in place.

The steam supply pipe 13 is connected to the end of the hub-like portion 72 of the joint casing 7. The drain pipe 14 extends through the hollow steam connection 5 down into the lower side of the cylinder, as indicated by dotted lines in Fig. 1.

Its outer end is secured to a spider 141 cast integral with the hub portion 72 and is connected to an integral elbow portion 142 and delivers outwardly through the pipe 15, so that the cylinder is drained of the water of condensation in the usual way.

It will be observed that steam entirely fills the casing 7 and is delivered through the end of connection 5 into the drying cylinder. The hollow casing 7 forms an annular space. A certain amount of water of condensation will accumulate in the lower part of this casing and serve as a water lubricant for the bearing parts. The bearing ring 9 may be made of a metallic lubricator packing material or it may be made of graphite or of a bronze of such mixture as not to require lubrication.

Lubrication can be introduced to this bearing through the annular space 16 but, under the circumstances indicated, it is not really necessary. It is, however, of some slight advantage until the joint is effectively lapped in.

It will be observed that this joint is quite flexible and is substantially universal in its action. All matters of defects in alignment are effectively taken care of by the flat bearing surfaces 61 and 102 which permit relative lateral movement. The annular space 16 and similar space 161 within the rings 9 and 12 provide for free movement in these directions.

Because the outer bearing surfaces are segments of a sphere, they are very readily machined and permit of angular displacement, if that should occur. Therefore, it is possible to have a completely tight steam joint between the bearing members 6, 8 and 9. The exact fit of the bearings at the other end to make a steam tight joint is not required. They simply need to be adequate bearing surfaces. The joint would be effective with the flat bearing surface 102 at the outer end, but there is some slight advantage in providing the spherical bearing on the ring 12.

It will be observed that steam may enter the chamber in the member 7 and that therefore the steam pressure on the joint members varies with the pressure of steam in the system, which is a matter of substantial advantage.

I desire to claim this invention in the exact form in which I have produced it, because of its superiority, and also to claim the same broadly as pointed out in the appended claims.

Having thus described my invention, what I claim as new and desire to secure by Letters Patent is:

1. In a joint of the class described, the combination in a tubular joint member of a hollow hub bearing carried thereby, of a fixed collar carried by said member, a casing joint member embracing said tubular member and fixed collar in spaced relation thereto, an inwardly projecting flange carried by the said casing with a central aperture larger than the diameter of said tubular member and permitting lateral relative movement of said parts, a bearing ring larger than the said tubular member with a flat radial bearing surface on one side fitting a corresponding bearing surface on the said fixed collar, a bearing surface constituting the segment of a sphere fitting within a corresponding concave bearing surface on the said flange, and means for maintaining the said parts in yielding contact, whereby there can be angular and also lateral relative movement of said joint members.

2. In a joint of the class described, the combination in a tubular joint member of a hollow hub bearing carried thereby, of a fixed collar carried by said member, a casing joint member embracing said tubular member and fixed collar in spaced relation thereto, an inwardly projecting flange carried by the said casing with a central aperture larger than the diameter of said tubular member and permitting lateral relative movement of said parts, a bearing ring larger than the said tubular member having a flat radial bearing surface on one side and with the bearing surface on the other side constituting the segment of a sphere interposed between the said fixed collar and inwardly projecting flange and fitting corresponding bearing surfaces therein, and means for maintaining the said parts in yielding contact, whereby there can be angular and also lateral relative movement of said joint members.

3. In a steam joint, the combination of a tubular bearing hub, a tubular steam connection thereto, a fixed collar having a flat face towards the said hub secured to said steam connection, a slidable collar corresponding thereto towards the outer end thereof, the outer face of said collar being a plane bearing surface, a spring to hold the said collars yieldingly apart, a joint casing surrounding the said parts having an inwardly projecting bearing flange in spaced relation to the steam connection and provided with a concave inner bearing surface constituting a part of a sphere, and having a corresponding concave bearing surface on a reduced portion of the said casing, and bearing rings having flat inner surfaces and convex outer surfaces corresponding to the segments of a sphere.

4. In a steam joint of the class described, the combination with a tubular steam pipe having an annular shoulder, a fixed collar threaded to said pipe and abutting said shoulder, a movable collar slidably but non-rotatably carried by said pipe in spaced relation to said fixed collar, a compression spring encircling said pipe and baring against the inner faces of said collars, a flared casing having a concave inner bearing surface opposite said slidable collar, a flange detachably carried by said casing having a concave inner bearing surface opposite said fixed collar, and bearing rings having convex outer bearing surfaces disposed between said collars and said concave bearing surfaces.

5. In a steam joint of the class described, the combination with a steam pipe having an annular shoulder, a fixed collar abutting said shoulder, a movable collar slidably but non-rotatably carried by said pipe in spaced relation to said fixed collar, a compression spring bearing against the inner faces of said collars, a flared casing having a concave inner bearing surface opposite said slidable collar, a flange carried by said casing having a concave inner bearing surface opposite said fixed collar, and bearing rings having convex outer bearing surfaces disposed between said collars and said concave bearing surfaces.

6. In a joint of the class described, the combination with a tubular member, of a fixed collar carried by said member, a movable collar slidably but non-rotatably carried by said member, a resilient means forcing said collars apart, a flared casing having a concave inner bearing surface opposite said movable collar and a flange provided with a concave inner bearing surface opposite said fixed collar, and bearing rings having convex outer bearing surfaces disposed between said collars and said concave bearing surfaces.

GEORGE E. JOHNSON.